April 14, 1970 J. GUZAK, JR., ET AL 3,506,960

DATA HANDLING SYSTEM

Filed July 31, 1967 2 Sheets-Sheet 1

INVENTORS
JOHN GUZAK, JR.
RICHARD M. IRELAND
BY Joseph J. Grass
ATTORNEY

DATA HANDLING SYSTEM

Filed July 31, 1967 2 Sheets-Sheet 2

INVENTORS
JOHN GUZAK, JR.
RICHARD M. IRELAND
BY Joseph J. Grass
ATTORNEY

United States Patent Office 3,506,960
Patented Apr. 14, 1970

3,506,960
DATA HANDLING SYSTEM

John Guzak, Jr., Waukegan, and Richard M. Ireland, Long Grove, Ill., assignors to SCM Corporation, New York, N.Y., a corporation of New York Filed July 31, 1967, Ser. No. 657,413
Int. Cl. H03k 13/32
U.S. Cl. 340—146.1 19 Claims

ABSTRACT OF THE DISCLOSURE

There is disclosed a data handling system in which each incoming serial bit binary code signal is checked to indicate whether or not the signal has a predetermined odd or even number of similar bits, that is, mark and parity bits, and in which the incoming serial signal is converted to a parallel output signal. A memory device is conditioned by each similar bit as each similar bit is serially detected After the memory device has been conditioned by all the similar bits and when the last bit of the incoming signal has been received an indicator denotes whether or not the incoming signal was correct. Assuming the incoming signal is supposed to have an odd number of similar bits, the memory device in the form of a bistable multivibrator will be operated an odd number of times for a correct signal and an even number of times for an erroneous signal; if the multivibrator had been operated an odd number of times, the indicator would not be operated; if the multivibrator had been operated an even number of times, the indicator would be operated. The condition of the multivibrator is read at the end of the received signal. The components of the serial-to-parallel converter are in part common with the components of the checking arrangement, such common components including a bit detector, a control register, an oscillator, an electronic counter, a reset one shot for the counter, and an AND gate connecting the control register and the oscillator with the counter.

This invention relates to an error checking arrangement for a data handling system.

In the handling of data it is often desirable to determine whether or not there has been either a loss or gain of bits between the transmitter and the receiver. It is common practice to transmit signals, all of which have either a predetermined odd or an even characteristic of the number of similar bits. If the signals are to have an odd number of similar bits the signals are referred to as being of "odd parity" and conversely if the signals are to have an even number of similar bits the signals are referred to as being of "even parity." Similar bits, for example, mark and parity bits, are considered to be similar in that they have the same voltage level. If the signal to be transmitted has an odd number of mark bits and the signal is to be an odd parity signal, no parity bit is added at the transmitter; however, if the signal to be transmitted has an even number of mark bits and the signal is to be an odd parity signal, a parity bit is added at the transmitter. Similarly, in signals which are to be even parity, a parity bit is added to each signal having an odd number of mark bits.

In accordance with the invention, there is provided an improved relatively simple and inexpensive arrangement for checking an incoming or received serial binary code signal. If all the incoming signals correspond to the predetermined parity of the transmitted signals no error is indicated, but if any incoming signal fails to correspond to the predetermined parity of the transmitted signal an error is indicated.

It is a feature of the invention to provide an improved data handling system in which a parity checking arrangement is provided in conjunction with a serial-to-parallel signal converter, wherein components used in the parity checking arrangement are also used in the serial-to-parallel converter.

It is a feature of the invention to provide an improved parity checking arrangement in which a memory device is conditioned each time a similar bit of the incoming signal is detected; when the last bit of the signal has been received, the system determines whether or not the parity of the incoming signal is the same as the predetermined parity, and if it is not the same an indicator is operated.

Other features will become apparent from the following detailed description and the accompanying drawings, in which.

Figure 1:
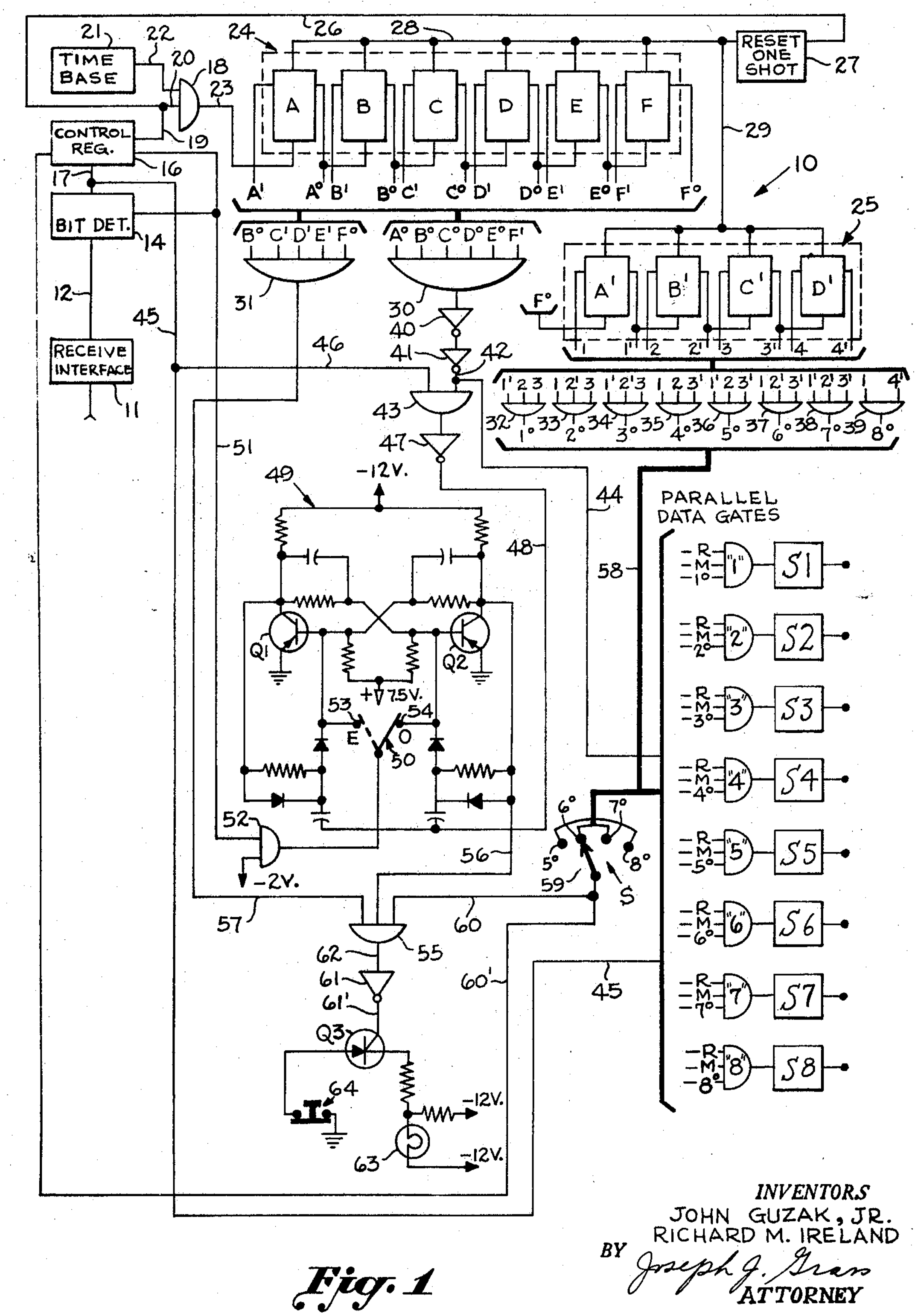
FIGURE 1 is a schematic view using logic symbols and illustrating a data handling system having an error checking arrangement in accordance with the invention.

Referring now to FIGURE 1 of the drawings, there is shown a data handling system generally indicated at 10. The system 10 not only checks for parity error in the incoming serial bit binary code signal, but it also converts this incoming serial signal to a parallel bit output signal. The incoming serial signal, transmitted from a suitable source of data transmission, is received by a receive interface 11 which adapts the incoming signal to the remainder of system 10. A bit detector 14, which senses similar intrasignal bits in the signal, is connected to the output of receive interface 11 by a conductor 12. A control register 16, operable at the initiation of each incoming signal combination, in particular by the start or synchronization pulse, is connected to the output of bit detector 14 by a conductor 17. Control register 16 is connected to an AND gate 18 by conductors 19 and 20. The output of a time base 21, for example a crystal oscillator, is connected to AND gate 18 by a conductor 22. The output of AND gate 18 is connected by a conductor 23 to the trigger input of register A of an electronic divide-by-sixty-four binary counter generally indicated at 24. Register A has outputs A′ and A°, register B has outputs B′ and B°, and so on as indicated in FIGURE 1. The output F° of register F serves as an input to register A′ of an electronic divide-by-sixteen binary counter generally indicated at 25. Register A′ of counter 25 has outputs 1 and 1′, register B′ has outputs 2 and 2′, and so on as indicated in FIGURE 1. Conductor 19 from control register 16 is connected through a branch conductor 26 to a reset one shot 27. Each time control register 16 enables the AND gate 18 upon reception of a start pulse, a pulse through conductors 19 and 26 operates the reset one shot 27 to reset counters 24 and 25 through respective conductors 28 and 29.

Predetermined different ones of the outputs from the six stages of counter 24 are respectively connected as inputs for two AND gates 30 and 31. The letters indicated for the inputs to the AND gates 30 and 31 correspond to letters indicated for the outputs of registers A through F of counter 24. Likewise, predetermined ones of the outputs of counter 25 connect to inputs of specific ones of AND gates 32 through 39. The numbers indicated for the inputs to AND gates 32 through 39 correspond to the numbers indicated for outputs from the registers A′ through D′ of counter 25. Predetermined ones of outputs 1° through 8° of respective AND gates 32 through 39 are connected to specific ones of parallel data AND gates "1" through "8." The registers A′, B′, C′, and D′ of counter 25 sequentially enable AND gates 32 through 39. The first bit of the incoming signal, be it a mark or space bit, will appear at the output conductor 1°, the second bit of the incoming signal will appear at the output conductor 2°, and so on. Each of parallel data AND gates "1" through "8" provides a data bit output to a respective storage register S1 through S8. The storage registers S1 through S8 provide a parallel output signal.

The output of AND gate 30 is serially passed through amplifiers 40 and 41. An output conductor 42 from amplifier 41 is connected to an AND gate 43 and to a branch conductor 44, conductor 44 being connected to all of the inputs R to the parallel data AND gates "1" through "8." A conductor 45, connected as a branch from the conductor 17, is connected to another branch conductor 46 which in turn is connected to an input of the AND gate 43. When AND gate 43 is enabled by pulses in both input conductors 42 and 46, an output pulse amplified by an amplifier 47, passes via a conductor 48 to a memory device shown to take the form of a bi-stable multivibrator generally indicated at 49.

Multivibrator 49 can be initially set in either one of two states by means of a switch 50. A conductor 51, from detector 14 and control register 16, connects through to the switch 50. Switch 50 can be manually selectively positioned to engage either one of contacts 53 and 54 designated E and O, respectively; E designates an even number of similar bits even parity, and O designates an odd member of similar bits or odd parity. When switch 50 is set to engage contact 54 as indicated in FIGURE 1, the transistor Q2 will be initially set to its "off" on non-conducting condition by the control register 16 at the initiation of each incoming serial signal as by a start or synchronization pulse if if is not already in that condition, and correspondingly the transistor Q1 will be automatically set to the "on" or conducting condition, assuming it is not already in that condition. Each pulse conducted to the multivibrator 49 via the conductor 48 will change the conditions of both transistors Q1 and Q2 from their previous conditions.

Assuming the multivibrator 49 is in its initial condition and the switch 50 is in the position shown in FIGURE 1, the first pulse in conductor 48 will reverse the condition of multivibrator 49 by turning transistor Q2 on and turning transistor Q1 off. The next successive pulse in the conductor 48 will turn the transistor Q2 off and will turn the transistor Q1 on, and so on for each successive pulse.

The output from multivibrator 49 is connected to the input of an AND gate 55 by a conductor 56. Also the output of AND gate 31 is connected to the input of AND gate 55 by a conductor 57. AND gate 55 also has a third input 60, the purpose of which will be described hereinafter.

A selector switch S, enabling use with 4, 5, 6, or 7 bit codes, has contacts 5° through 8° which are individually connected by four conductors of the conductor group 58 to the respective outputs 5° through 8° of gates 36 through 39, respectively. Depending upon the selected position of the movable contact arm 59, the switch S connects conductors 60 and 60′ to the output conductor of the selected gate 36, 37, 38, or 39. For a five bit code the switch arm 59 is positioned in contact with switch contact 6°, for a six bit code the switch arm 59 is positioned in contact with the switch contact 7°, and so on. Thus, the switch arm 59 is always connected to the selected AND gate 36, 37, 38, or 39 at which the last bit, namely, a parity bit, will appear, and the last bit thereby pulses conductors 60 and 60′. When coincidence exists in the condition of input conductors 56, 57 and 60 to AND gate 55 for example when these conductors are all at negative potential, the AND gate 55 is enabled and an output signal is applied via a conductor 62 to an amplifier 61 via a conductor 61′ to the control electrode of a silicon controlled rectifier Q3 rendering the SCR Q3 conductive, thereby completing a circuit through an indicator, for example a lamp 63. The (SCR) silicon controlled rectifier Q3 maintains the lamp lit until a momentary manual switch 64 is depressed to disconnect the SCR Q3 from ground. Other types of indicators can be used, such as an audible alarm, a print-out device or the like, as desired. Amplifier 61 is of the inverting type, as are the amplifiers 40, 41 and 47.

Figure 3:
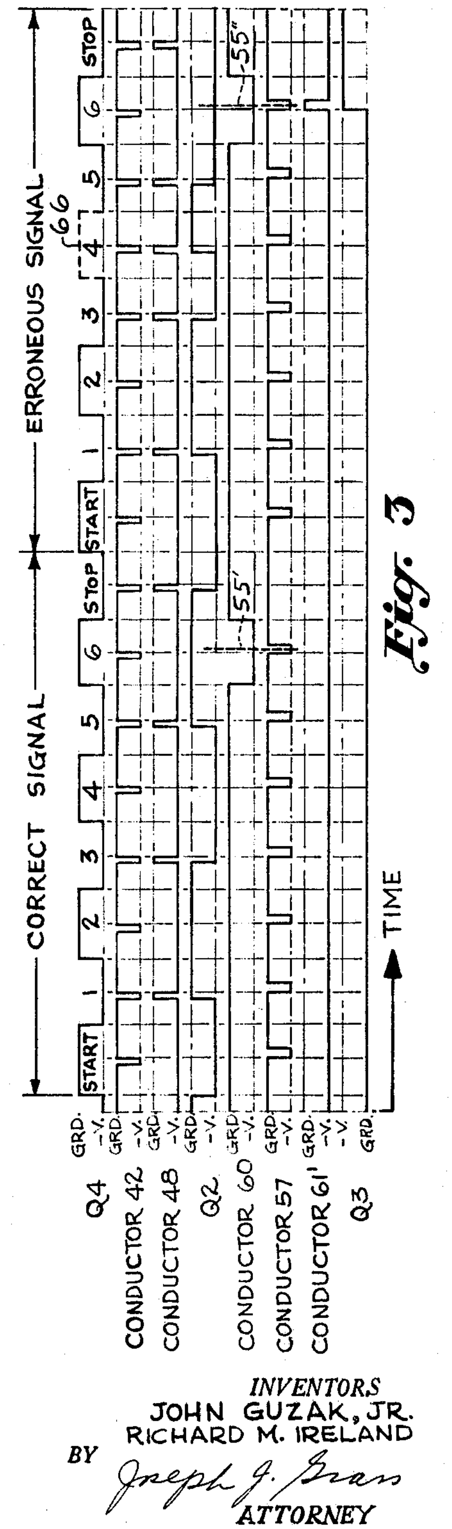
FIGURE 3 is a view showing waveforms occurring at various locations in the system.

With reference to FIGURE 3, it is indicated that a pulse is applied to the conductor 48 during the occurrence of each similar bit of the signal, and that a pulse is applied to the conductor 57 during the occurrence of each similar bit but subsequent time to the occurrence of each pulse in the conductor 48. This assures that the multivibrator 49 will be conditioned by every similar bit including the last similar bit in the signal. The pulses applied to the conductor 48 occur near the middle of the binary count, for example at binary count 31, and the pulses applied to the conductor 57 occur near the middle of the binary count but subsequent in time to the application of the pulse to the conductor 48, for example at binary counts 33 and 34. By this arrangement the start and termination and, moreover, the first and last portions of the similar bits are not relied upon for checking errors.

The parallel data AND gate "1" is only enabled when its inputs R, D and 1 are pulsed, in particular when negative potential is applied to them; the parallel data AND gate "2" is only enabled when its inputs R, D and 2° are pulsed; and so on. For example, if an incoming signal has five bits and in particular has two mark bits followed by three space bits, the AND gates 32 and 33 will have outputs at conductors 1° and 2°, but the AND gates 34, 35, and 36 and also AND gates 37, 38, and 39 will have no outputs at conductors 3° through 8°. Hence only parallel data AND gates "1" and "2" will have data outputs for the exemplary signal combination of mark-mark-space-space-space.

Figure 2:
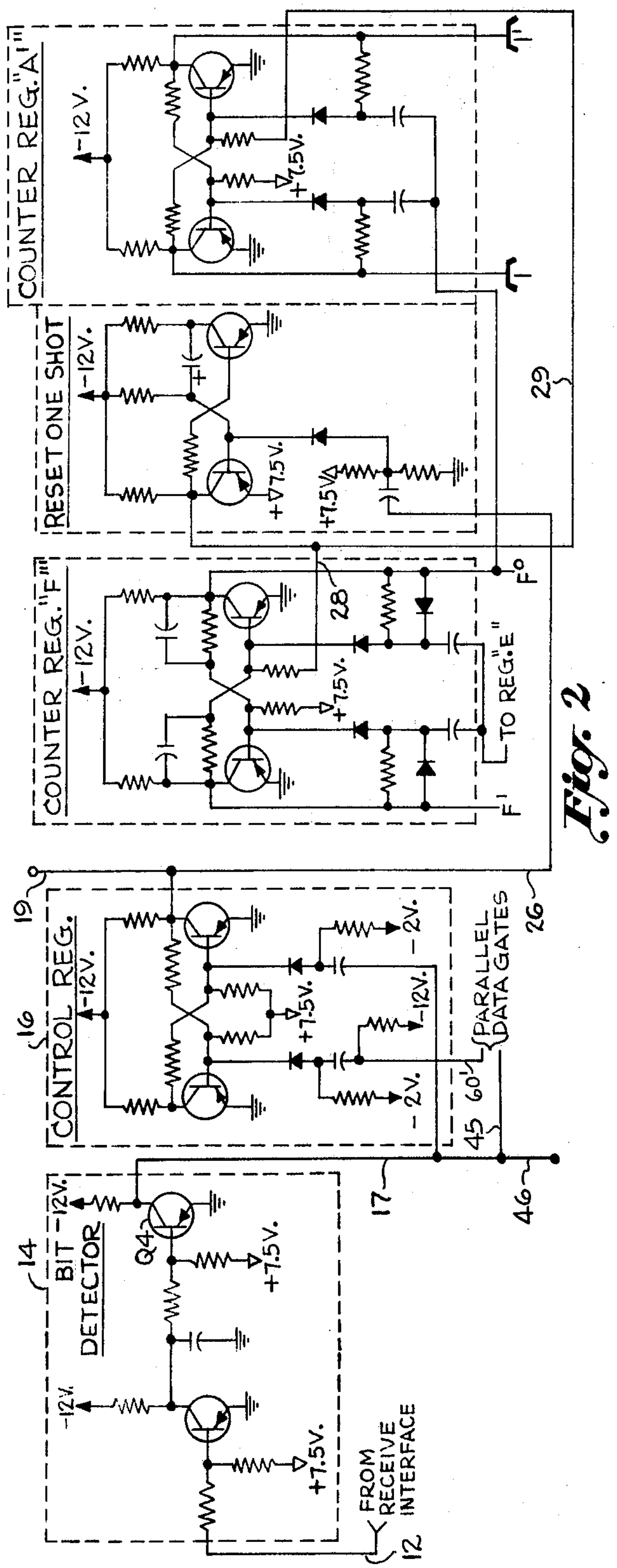
FIGURE 2 is a circuit diagram for various ones of the components shown schematically in FIGURE 1.

When an incomig serial bit signal is applied to system 10 it is not known whether or not this signal has the predetermined odd or even number of intra-signal similar bits. A bit may have been lost during transmission of the signal or electrical noise in the signal may have caused a bit to be added. The waveform of FIGURE 3 which is identified as Q4 represents the condition of a transistor Q4 (FIGURE 2) during reception of incoming signals. Two signals are depicted, one signal being identified as "Correct Signal" and the other being identified as "Erroneous Signal." The Correct Signal contains a start pulse, intra-signal mark bits at each of the 1, 3, and 5 positions, space bits at the 2 and 4 positions, there being no parity bit at the 6 position, and a stop bit at the 7 position. In Baudot Code, this arrangement of space bits and mark bits would represent the letter Y. The system is set to check for odd parity, because of the position of the switch 50, wherein an incoming signal having an odd number of similar intra-signal bits will not operate the AND gate 55, and hence the lamp 63 will not be lit. Correspondingly, an incoming signal having an even number of similar bits, as for example the signal identified in FIGURE 3 as "Erroneous Signal" will cause operation of the AND gate 55 and consequent lighting of the lamp 63. The Erroneous Signal should also have been the letter Y. However, a mark bit rather than a space bit was received at the 4 position, as indicated by the broken line 66. Hence the incoming signal had four similar bits, that is, an even number of similar bits; thus, the signal was erroneous. It is noted that that the condition of the conductor 56 is the same as the condition of the collector of transistor Q2; either both are at negative potential or both are at ground potential. In FIGURE 3, a line 55′ is drawn so as to traverse the waveforms identified as Q2, Conductor 60, and Conductor 57 of the Correct Signal. As these waveforms indicate that all three of the inputs to the AND gate 55 are not simultaneously at negative potential, the AND gate 55 is not enabled and therefore no control pulse is applied to the SCR Q3 and lamp 63 will not be lit. A second line 55'' is drawn on FIGURE 3 so as to traverse the waveforms identified as Q2, Conductor 60, and Conductor 57 of the Erroneous Signal. As all three of these waveforms indicate that all three of the inputs to the AND gate 55 are simultaneously at negative potential, the AND gate 55 is enabled and a pulse, indicated in the waveform identified as "Conductor 61'," is applied to the control electrode of SCR Q3 which causes completion of the circuit through the lamp 63. The SCR Q3 continues to remain on, as indicated by the waveform identified as Q3 in FIGURE 3, even after the output pulse from the AND gate 55 ceases to exist, until the switch 64 is actuated.

The system 10 can as well be set to check for even parity, by setting the switch 50 in contact with the contact 53; an incoming signal having an even number of similar intra-signal bits will not operate the AND gate 55 to effect lighting of the lamp 63, whereas an odd number of similar intra-signal bits will operate the AND gate 55 to effect lighting of the lamp 63.

The invention may be embodied in other specific forms without departing from the spirit or essential characteristics thereof. The present embodiment is therefore to be considered in all respects as illustrative and not restrictive, the scope of the invention being best defined by the appended claims rather than by the foregoing description, and all changes which come within the meaning and range of equivalency of the claims are therefore intended to be embraced therein.

We claim:

1. In a data handling system for indicating errors in incoming serial bit binary code signals composed of varying numbers of similar intra-signal bits, correct code signals having a predetermined characteristic selected from an odd or even number of similar bits and erroneous code signals not having the predetermined odd or even number of similar bits, comprising: means for indicating an erroneous signal, means for operating said indicating means, and control means responsive to the incoming code signals for actuating said operating means when the code signal does not contain the predetermined odd or even number of bits, said control means including first circuit means having memory means conditionable by each of said similar bits in said code signal, second circuit means rendered effective by each bit of said code signal, and third circuit means effective only when all the bits of the incoming code signal have been received, said first, second, and third circuit means of said control means being operative in combination to actuate said operating means only when all the bits of the incoming code signal have been received and only when said memory means is in a condition not corresponding to the predetermined characteristic of odd or even number of bits.

2. In a system as defined in claim 1, said control means including counting means, and an oscillator for stepping said counting means, said first, second, and third circuit means each being rendered operative in response to a predetermined count of said counting means.

3. In a system as defined in claim 1, wherein said control means includes a counter.

4. In a system as defined in claim 1, wherein said memory means includes a bi-stable multivibrator, and means forming part of said control means for setting said bistable multivibrator to an initial condition at the initiation of each received code signal.

5. In a system as defined in claim 1, including means for selectively setting said memory means to indicate an erroneous signal having either odd or even numbers of similar bits.

6. In a system as defined in claim 1, wherein said control means includes means for conditioning said memory means between the start and termination of each bit.

7. In a system as defined in claim 1, wherein said control means includes counter means, and means connected to said counter means for providing a parallel bit output code signal representative of said received code signal.

8. In a system as defined in claim 1, wherein said control means includes means for detecting each similar bit, counting means, and means responsive to said detecting means and said counting means for providing a parallel bit output code signal, representative of said received code signal.

9. In a system as defined in claim 1, wherein said operating means includes an AND gate to which said first, second, and third circuit means are connected.

10. In a system as defined in claim 1, including means for continuing the operation of said indicating means following completion of operation of said operating means, said operation continuing means including a silicon controlled rectifier.

11. In a data handling system for indicating errors in incoming binary code signals composed of varying numbers of similar intra-signal bits, correct code signals having a predetermined characteristic selected from an odd or even number of similar bits and erroneous code signals not having the predetermined odd or even number of similar bits, comprising: means for handling binary code signals including means for receiving said signals and electronic counting means, means formed in part by said handling means and including said counting means for checking for an erroneous incoming signal, said checking means including memory means electrically connected to said counting means for keeping track of the similar bits which have been received, and means responsive to said checking means for indicating the occurrence of the erroneous code signal.

12. In a system as defined in claim 11, wherein said receiving means includes means for receiving serial bit binary code signals, and said handling means including means for providing parallel bit output signals.

13. In a data handling system for indicating errors in incoming serial bit binary code signals composed of varying numbers of similar intra-signal bits, correct code signals having a predetermined characteristic selected from an odd or even number of similar bits, and erroneous code signals not having the predetermined odd or even number of similar bits, comprising: means for converting the incoming serial bit signal to a parallel bit output signal, said signal converting means including electronic counter means having a plurality of outputs, said outputs including a first output providing an output pulse for each received similar bit and a second output providing an output pulse when the last bit of the signal has been received, memory means operatively connected to said first output and conditioned by each output pulse on said first output, indicating means, and means operatively connected to said memory means and to said second output for operating said indicating means when the received signal is erroneous.

14. In a system as defined in claim 13, wherein said memory means includes a bistable multivibrator, and means including a manual switch for selectively enabling indication of an erroneous signal of either an odd or an even number of similar bits.

15. In a system as defined in claim 13, wherein said electronic counter means includes an electronic binary counter, and said plurality of outputs are provided by gating circuits operatively connected to said electronic binary counter.

16. In a system as defined in claim 13, said electronic counter means including an electronic binary counter, said first output including means operatively connected to said binary counter for conditioning said memory means only during the middle portion of the output pulse on said first output.

17. In a system as defined in claim 13, including means operatively connected to said operating means for enabling said operating means to be operative only during the middle portion of the output pulse on said second output but after the memory means has been conditioned by the last bit.

18. In a system as defined in claim 13, said operating means including an AND gate having three inputs, one of said inputs being operatively connected to said memory means, another of said inputs being operatively connected to said second output, and the remaining input being operatively connected to a remaining output of said plurality of outputs.

19. In a data handling system for indicating errors in incoming binary code signals composed of varying numbers of similar intra-signal bits, correct code signals having a predetermined characteristic selected from an odd or even number of similar bits, and erroneous code signals not having the predetermined odd or even number of similar bits, comprising: means for handling binary code signals including means for receiving said signals and electronic counter means coupled with signal receiving means, said electronic counter means having a plurality of outputs including a first output providing an output pulse for each received similar bit and a second output providing an output pulse when the last bit of the signal has been received, memory means operatively connected to said first output and conditioned by each output pulse on said first output, indicating means, and means operatively connected to said memory means and to said second output for operating said indicating means when the received signal is erroneous.

References Cited

UNITED STATES PATENTS

| | | | |
|---|---|---|---|
| 2,909,768 | 10/1959 | Kautz | 340—146.1 X |
| 3,248,695 | 4/1966 | Dascotte | 340—146.1 |
| 3,398,400 | 8/1968 | Rupp et al. | 340—146.1 |

MALCOLM A. MORRISON, Primary Examiner

C. E. ATKINSON, Assistant Examiner

U.S. Cl. X.R.

235—153